(12) United States Patent
Saito et al.

(10) Patent No.: US 7,249,453 B2
(45) Date of Patent: Jul. 31, 2007

(54) CONTROL DEVICE FOR AN INTERNAL COMBUSTION ENGINE

(75) Inventors: Kenji Saito, Nagoya (JP); Yoshiaki Higuchi, Okazaki (JP); Hitoshi Kamura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/315,239

(22) Filed: Dec. 23, 2005

(65) Prior Publication Data

US 2006/0137326 A1 Jun. 29, 2006

(30) Foreign Application Priority Data

Dec. 27, 2004 (JP) ............................. 2004-376165

(51) Int. Cl.
*F01N 3/00* (2006.01)
(52) U.S. Cl. ..................... 60/277; 60/276; 60/285; 60/278
(58) Field of Classification Search ............... 60/276, 60/277, 285, 299
See application file for complete search history.

(56) References Cited

U.S. PATENT DOCUMENTS

| 5,220,788 | A | * | 6/1993 | Kurita et al. ............... 60/274 |
| 5,301,501 | A | * | 4/1994 | Shimizu et al. ............. 60/274 |
| 5,337,555 | A | * | 8/1994 | Tokuda et al. .............. 60/276 |
| 5,337,558 | A | * | 8/1994 | Komatsu .................... 60/276 |
| 5,528,898 | A | * | 6/1996 | Nakayama et al. .......... 60/276 |
| 5,570,575 | A | * | 11/1996 | Sato et al. ................. 60/277 |
| 5,713,197 | A | * | 2/1998 | Ogawa et al. .............. 60/276 |
| 5,732,552 | A | * | 3/1998 | Matsumoto et al. ......... 60/276 |
| 5,945,597 | A | * | 8/1999 | Poublon et al. ........... 73/118.1 |
| 5,979,160 | A | * | 11/1999 | Yashiki et al. ............. 60/276 |

FOREIGN PATENT DOCUMENTS

JP      2001-263100 A      9/2001

* cited by examiner

*Primary Examiner*—Thomas Denion
*Assistant Examiner*—Diem Tran
(74) *Attorney, Agent, or Firm*—Birch, Stewart, Kolasch & Birch, LLP

(57) ABSTRACT

Prior to failure determination of a three-way catalyst, which is carried out on the basis of a reverse frequency ratio of upstream and downstream $O_2$ sensors, deterioration determination is performed at the point when the reverse frequency ratio of the $O_2$ sensors starts to increase, and low NOx control is then implemented. The implement of the low NOx control makes it possible to compensate for the deterioration of the three-way catalyst with respect to NOx purification and to keep NOx emissions from the three-way catalyst equal to or less than the regulation value.

9 Claims, 5 Drawing Sheets

CONTROL DEVICE FOR AN INTERNAL COMBUSTION ENGINE

BACKGROUND OF THE INVENTION

1. Field of the Invention

The present invention relates to a control device for an internal combustion engine provided with a three-way catalyst for exhaust gas purification in an exhaust system, and more specifically to a control device for an internal combustion engine having a failure determining function that carries out a catalyst failure determination on the basis of results of the detection of air-fuel ratios on the upstream and the downstream side of the catalyst.

2. Description of the Related Art

For example, an exhaust system of an internal combustion engine for a vehicle is provided with a three-way catalyst for exhaust gas purification. Feedback control is performed to bring exhaust gas close to a theoretical air-fuel ratio, and the three-way catalyst then carries out the oxidation of hydrocarbon (HC) and carbon monoxide (CO) and the reduction of nitrogen oxide (NOx), thereby decreasing harmful substances contained in the exhaust gas. A three-way catalyst of this type is gradually deteriorated (fails) in the course of being used, and is reduced in purification efficiency. In order to prevent the emission of harmful substances into the atmosphere when a catalyst that has failed continues to be used, by way of example, legislative regulations for OBD (on-board diagnosis) in North America stipulates that a failure determining function that detects and indicates a catalyst failure to prompt repair be provided to the vehicle.

Accordingly, a failure determining device that makes a catalyst failure determination on the basis of output of $O_2$ sensors installed upstream and downstream of the catalyst has been employed. The failure determining device operates through the use of the phenomenon that the feedback control causes the air-fuel ratio of exhaust gas to fluctuate at short periods around the vicinity of the theoretical air-fuel ratio, and the fluctuation of the air-fuel ratio is suppressed downstream from the catalyst because of the oxygen storage ability of the catalyst. In other words, so long as the catalyst retains the sufficient purification ability, the amplitude of fluctuation of the air-fuel ratio grows relatively small on the downstream side of the catalyst because of the oxygen storage ability, and at the same time a reverse frequency of between rich and lean conditions becomes relatively low. If the oxygen storage ability is declined as the catalyst deteriorates, this increases the amplitude of fluctuation of the air-fuel ratio on the downstream side of the catalyst, and also increases the reverse frequency, compared to the case in which the catalyst retains the sufficient purification ability. For this reason, the failure determining device makes a failure determination at the point when the reverse frequency ratio (the reverse frequency of the downstream $O_2$ sensor/the reverse frequency of the upstream $O_2$ sensor $\leq 1.0$) exceeds the specified failure determination value.

One of the measures for the suppression of discharge of harmful substances in the event of a catalyst failure is proposed, for example, in Unexamined Japanese Patent Publication No. 2001-263100 (hereinafter referred to as Patent Document 1). According to the technology disclosed in Patent Document 1, when a catalyst failure determination is made, for example, through the above-mentioned technique or the like, a variable valve timing mechanism is operated to advance the closing timing of the exhaust valve of an internal combustion engine and retard the opening timing of the intake valve, to thereby cause exhaust gas to remain in cylinders to lower NOx.

The technology disclosed in Patent Document 1, however, is employed only after the catalyst actually fails, and no measures are taken before the catalyst failure. As a consequence, the catalyst deterioration causes the problem that harmful substances are discharged into the atmosphere.

Furthermore, it is hard to say that the technique for making a catalyst failure determination can cope satisfactorily with the strengthening of the regulations especially with regard to NOx in late years. FIG. 6 shows the relationship of an $O_2$ sensor reverse frequency ratio with respect to NOx emissions from the catalyst in the process of catalyst deterioration. In FIG. 6, for example, if a failure determination value for making a comparison to the reverse frequency ratio in the event of a failure determination is set to be 0.8, the failure determination is made at point a of an output characteristic shown by a solid line. Therefore, the failure determination value can comply with the current OBD regulation value. On the other hand, however, it is impossible to make a failure determination before the failure determination value exceeds the future OBD regulation value that is lower than the current one.

One of possible measures against the above difficulty is, for example, to reduce the failure determination value to 0.4 and make a failure determination at point b before the NOx emissions exceed the future OBD regulation value. In this case, however, the accuracy of the failure determination is decreased, leading to an erroneous determination. Moreover, even if no erroneous determination is made, the NOx emissions exceed the regulation value in spite of the fact that the catalyst is perfectly capable of HC purification, which produces another problem that the frequent replacement of an expensive three-way catalyst made of precious metals is required.

SUMMARY OF THE INVENTION

An aspect of the present invention is a control device for an internal combustion engine, comprising failure determining means for making a failure determination of a three-way catalyst of an internal combustion engine on the basis of an output of air-fuel ratio detecting means disposed upstream and downstream of the catalyst; deterioration determining means for determining a deterioration of the catalyst before the failure determining means makes a failure determination; and low NOx control means for controlling the internal combustion engine to be operated in an operating state where NOx emissions are lowered when the deterioration determining means determines a deterioration of the catalyst.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

A control device for an internal combustion engine according to one embodiment of the present invention will be described below.

Figure 1:
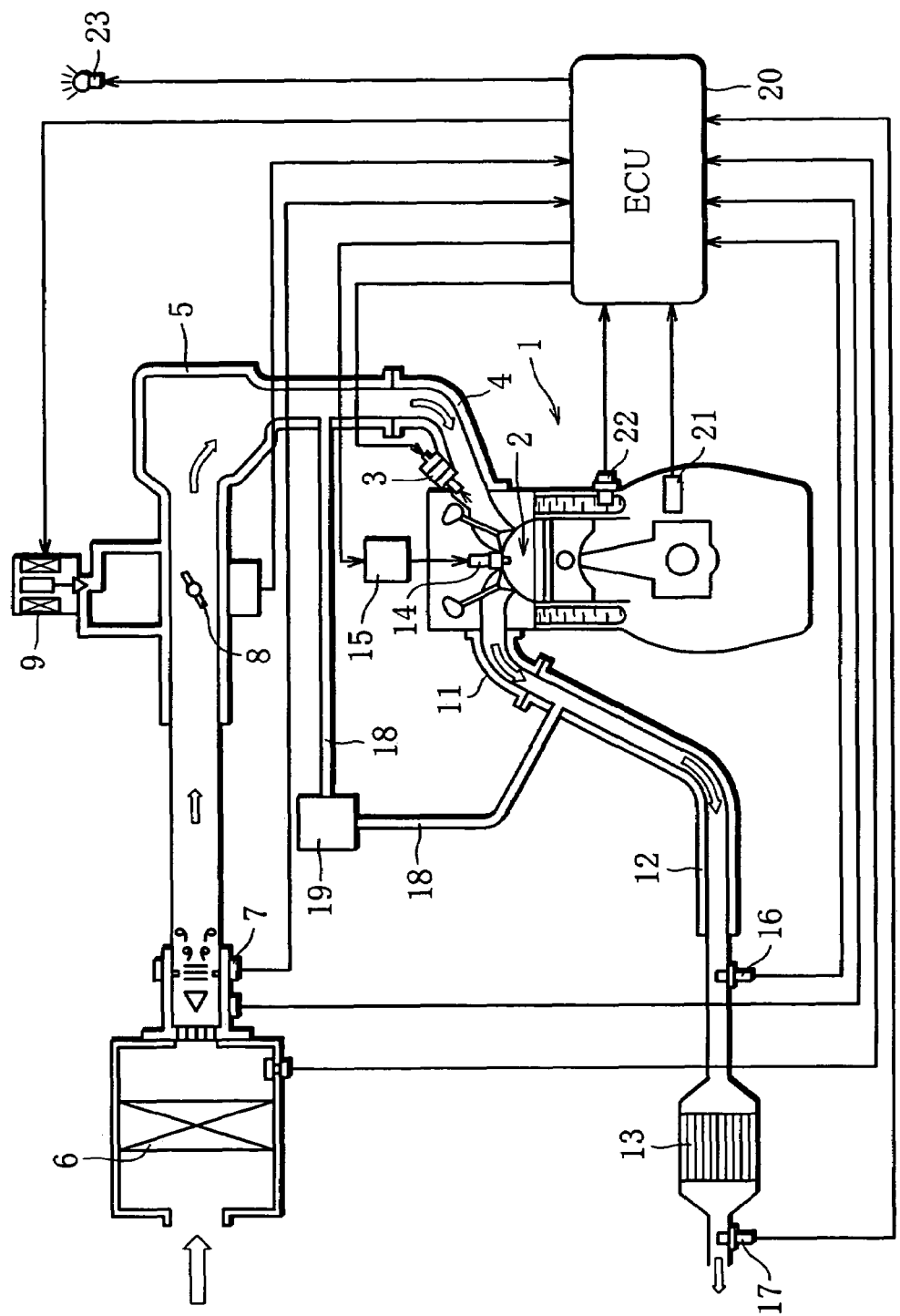
FIG. 1 is a schematic construction view showing a control device for an internal combustion engine according to one embodiment of the present invention.

FIG. 1 is a schematic construction view showing the control device for an internal combustion engine according to the embodiment. A combustion chamber 2 of each cylinder in an internal combustion engine 1 is connected to a common intake path 5 through an intake manifold 4 having a fuel injection valve 3. In the intake path 5, an air cleaner 6, an air flow sensor 7, a throttle valve 8, and an ISCV (idle speed control valve) 9 are interposed in this order from the upstream side. The combustion chamber 2 of each cylinder is connected to a common exhaust path 12 through an exhaust manifold 11. Connected to the exhaust path 12 are a three-way catalyst 13 and a silencer (not shown). A spark plug 14 is disposed on top of the combustion chamber 2 of each cylinder. Each spark plug 14 is supplied with high voltage generated in an ignition coil 15.

Intake air introduced into the intake path 5 is distributed to the cylinders by the intake manifolds 4 after being regulated in flow rate according to the opening of the throttle valve 8 or ISCV 9. The intake air is then introduced into the combustion chambers 2 during an intake stroke of the internal combustion engine together with fuel injected from the fuel injection valve 3 as air-fuel mixture. The introduced air-fuel mixture is ignited by the spark plugs 14 just before the compression top dead center to produce engine torque through combustion. Within each cylinder, exhaust gas after combustion is congregated by the exhaust manifolds 11, and is discharged into the atmosphere after circulating through the exhaust path 12 to the three-way catalyst 13 and the silencer.

Disposed upstream of the three-way catalyst 13 of the exhaust path 12 is an upstream $O_2$ sensor 16, whereas disposed downstream of the three-way catalyst 13 is a downstream $O_2$ sensor 17. The $O_2$ sensors 16 and 17 function as air-fuel ratio detecting means of the present invention, and they output voltages Vf and Vr according to oxygen concentrations of the exhaust gas before and after the exhaust gas passes through the three-way catalyst 13.

The exhaust path 12 and the intake path 5 are connected through an EGR path 18. Interposed in the EGR path 18 is an EGR valve 19. Part of the exhaust gas discharged from the combustion chambers 2 into the exhaust path 12 is re-circulated to the intake path 5 side through the EGR path 18 according to the opening of the EGR valve 19.

In a vehicle compartment, there are installed an ECU (electrical control unit) 20 having an input/output device, storage devices (ROM, RAM, nonvolatile RAM, etc.) storing a large number of control programs, a central processing unit (CPU), and a timer/counter and the like, which are not shown. The air flow sensor 7 and the $O_2$ sensors 16 and 17 are connected to an input side of the ECU 20. Likewise, various sensors including a revolution speed sensor 21 for detecting an engine revolution speed Ne, a water temperature sensor 22 for detecting a cooling water temperature TW, and the like are connected to the input side of the ECU 20, too. Connected to an output side of the ECU 20 are the fuel injection valves 3, the ISCV 9, the ignition coils 15, and the EGR valve 19. In addition, various devices including a warning light 23 disposed in the driver's seat, and the like are connected to the output side of the ECU 20 as well.

The ECU 20 controls the fuel injection valves 3, the ISCV 9, the ignition coils 15, the EGR valve 19, and the like, on the basis of detection information from each sensor, to thereby operate the internal combustion engine 1. In the process of fuel injection control, given conditions, including the condition that the activation of the upstream $O_2$ sensor 16 is completed and that the engine revolution speed Ne and engine load are equal to or less than given values, are satisfied, the ECU 20 implements feedback control based on the output voltage Vf of the upstream $O_2$ sensor 16. In the process of feedback control, the output voltage Vf of the upstream $O_2$ sensor 16 is feedbacked with the aim of the output voltage Vf corresponding to the theoretical air-fuel ratio (14.7) as a target value. By so doing, the air-fuel ratio of exhaust gas of the internal combustion engine 1 is maintained within a window of the three-way catalyst 13 close to the theoretical air-fuel ratio, and excellent purification efficiency is accomplished.

As a result of the feedback control, the air-fuel ratio of the exhaust gas fluctuates at short periods around the vicinity of the theoretical air-fuel ratio. This air-fuel ratio fluctuation is suppressed due to the oxygen storage ability possessed by the three-way catalyst 13 when the exhaust gas circulates through the three-way catalyst 13. The ECU 20 determines in stages a deteriorated state of the three-way catalyst 13 through the use of the above phenomenon. If there is a symptom of deterioration, the ECU 20 implements low NOx control intended to suppress NOx emissions from the internal combustion engine. When the deterioration increases, and the NOx or HC emissions reach a regulation value based on regulations, the ECU 20 indicates a failure to prompt repair. The following is about how to deal with the above situations.

For convenience of the explanation, the first explanation will be about a controlling state in which there is no symptom of deterioration of the three-way catalyst 13, and normal purification efficiency is accomplished. The subsequent explanation will be about a controlling state in which there is a symptom of deterioration, and the NOx emissions from the catalyst start to increase (hereinafter referred to as deterioration determination). Moreover, an ensuing explanation will be about a controlling state in which the deterioration increases, and the NOx or HC emissions from the catalyst reach the regulation value (hereinafter referred to as failure determination) in spite that the low NOx control is carried out.

Figure 2:
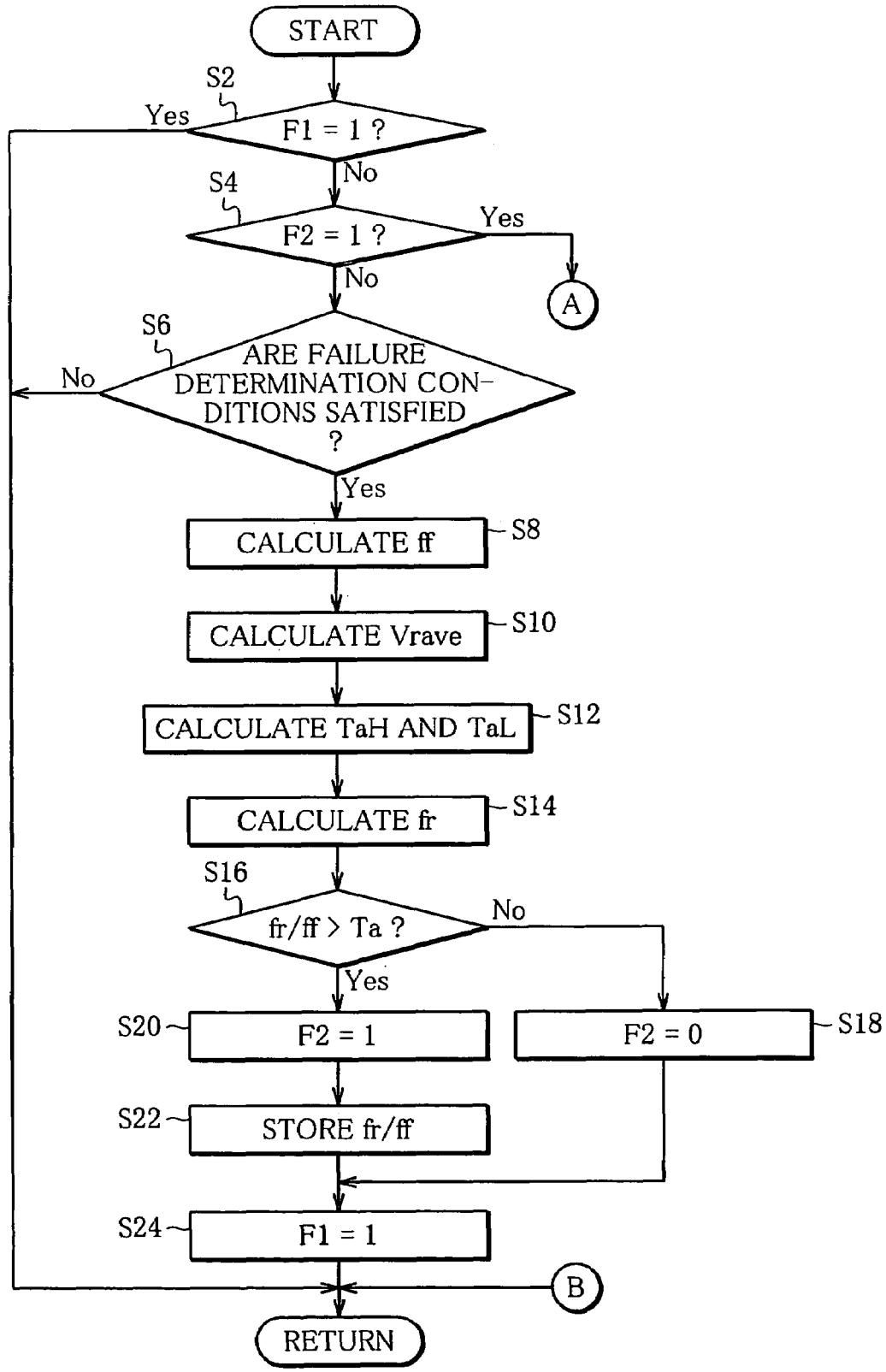
FIG. 2 is a flowchart showing a routine of catalyst failure determination implemented by an ECU.
Figure 3:
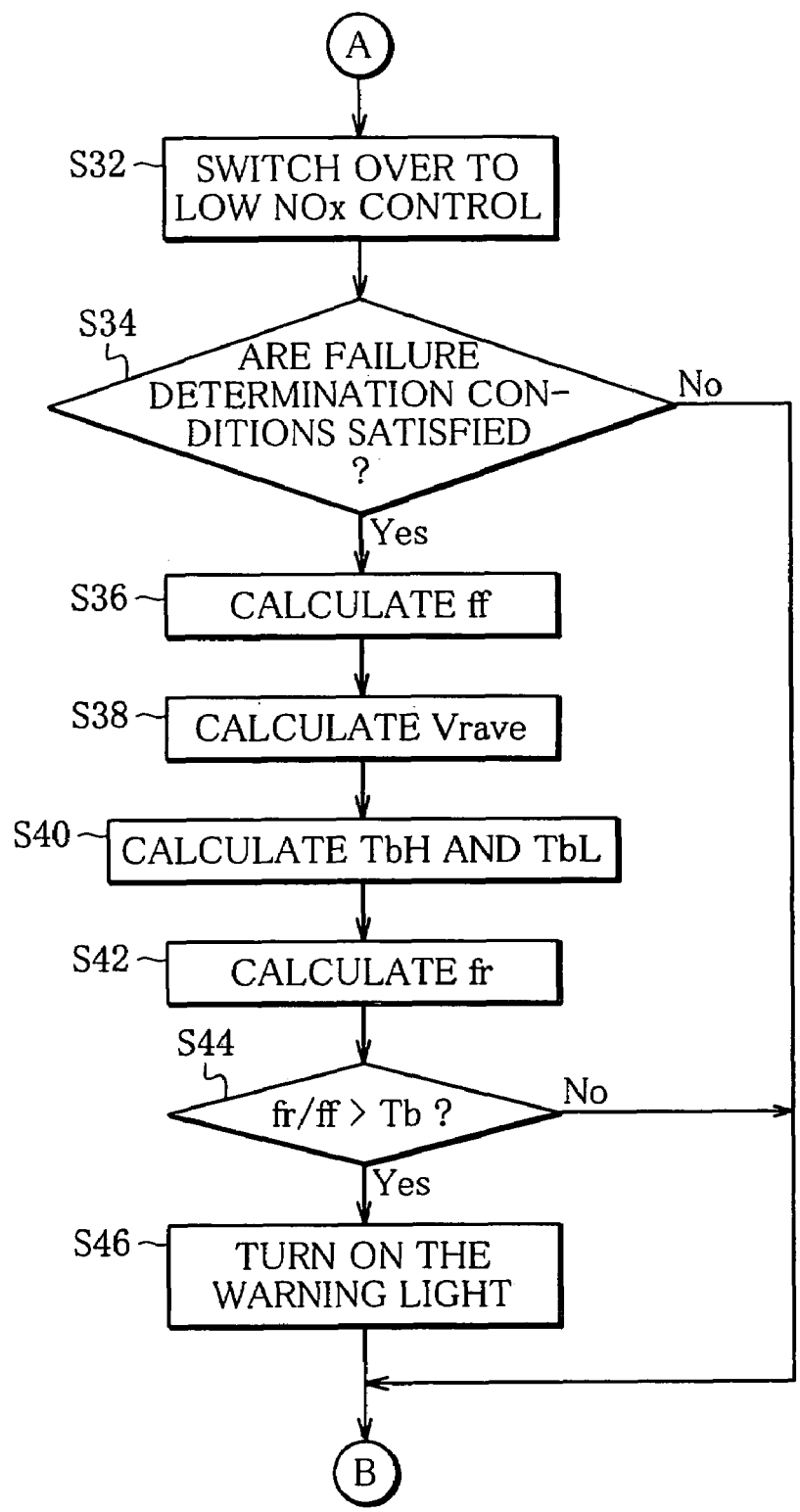
FIG. 3 is a flowchart showing a routine of catalyst failure determination implemented similarly by the ECU.

Once the internal combustion engine 1 starts up, the ECU 20 implements a routine of catalyst failure determination shown in FIGS. 2 and 3, and firstly makes a determination as to whether a determination completion flag F1 is set (=1) or not in Step S2. The determination completion flag F1 means that a failure determination with respect to the three-way catalyst 13 is completed. The determination flag F1 is reset (=0) simultaneously with ignition off of the vehicle. Accordingly, the determination completion flag F1 is reset at the beginning of engine startup, so that the ECU 20 judges that the failure determination is not completed, and makes a "NO" (negation) determination. The procedure is then advanced to Step S4.

Step S4 makes a determination as to whether a low NOx control flag F2 is set (=1) or not. The low NOx control flag F2 is for giving a command to implement the low NOx control. The setting state of the flag F2 is stored and can be backed up with a battery even if an ignition switch of the vehicle is turned OFF. Therefore, Step S4 determines the setting state of the low NOx control flag F2 at the time of previous operation. Since the three-way catalyst 13 is in the normal condition, the low NOx control flag F2 is reset. Therefore, the ECU 20 makes a "NO" determination and advances the procedure to Step S6.

In Step S6, the ECU 20 makes a determination as to whether execution conditions of catalyst deterioration and failure determination are satisfied. To be concrete, there is the condition that the feedback control is in execution during the fuel injection control, that the operation of the internal combustion engine 1 is stable with the engine revolution speed Ne and the engine load being within respective given ranges, and the like. If any one of the execution conditions is not satisfied, the ECU 20 makes a "NO" determination in Step S6 and terminates the routine.

When all the execution conditions are satisfied, and a "YES" determination is made in Step S6, the ECU 20 advances the procedure to Step S8 and calculates an upstream reverse frequency ff. According to a specific calculation method, the number of times the output voltage Vf of the upstream $O_2$ sensor 16 passes a threshold value V0 (for example, 0.5 V) within a given time period (for example, 10 sec.) is found. Then, this procedure is repeated for the given number of times (for example, seven times) to find an average value, which is defined as the upstream reverse frequency ff.

In a subsequent Step S10, the ECU 20 calculates an average value Vrave of output voltage Vr of the downstream $O_2$ sensor 17 in accordance with the following formula (1).

$$Vrave = a \times Vrave_{(n-1)} + (1-a) \times Vr \qquad (1)$$

where $Vrave_{(n-1)}$ is a previous average value, Vr is present output voltage of the downstream $O_2$ sensor 17, and a is a filter constant.

Unlike the upstream side, on the downstream side of the three-way catalyst 13, the air-fuel ratio fluctuation is suppressed by the oxygen storage ability shown by the three-way catalyst 13, while there generates a so-called oscillation of an air-fuel ratio, in which the air-fuel ratio shifts to the rich side and to the lean side at relatively long periods. The average value Vrave calculated in the above-described manner shifts, too, following this oscillation. By changing the filter constant a, it is possible to properly adjust accuracy and response as the average value Vrave shifts following the oscillation in relation to the actual air-fuel ratio.

Thereafter, the ECU 20 advances the procedure to Step S12, and calculates reverse reference values for deterioration determination TaH and TaL according to the following formulae (2) and (3).

$$TaH = Vrave + \alpha \qquad (2)$$

$$TaL = Vrave - \alpha \qquad (3)$$

where $\alpha$ is a hysteresis constant, which is set as a smaller value (for example, 0.078 V) than an after-mentioned hysteresis constant $\beta$ for failure determination with the aim of making a deterioration determination at an earlier stage.

Subsequently, the ECU 20 advances the procedure to Step S14. The ECU 20 finds the number of times the output voltage Vr of the downstream $O_2$ sensor 17 passes the reverse reference values TaH and TaL that are set on an increase side and an decrease side from the average value Vrave, respectively, within the given time period applied in the calculation of the upstream reverse frequency ff. The ECU 20 repeats this procedure for the given number of times in the same manner as the calculation of the upstream reverse frequency ff and defines an average value as a downstream reverse frequency (second downstream reverse frequency) fr.

Figure 4:
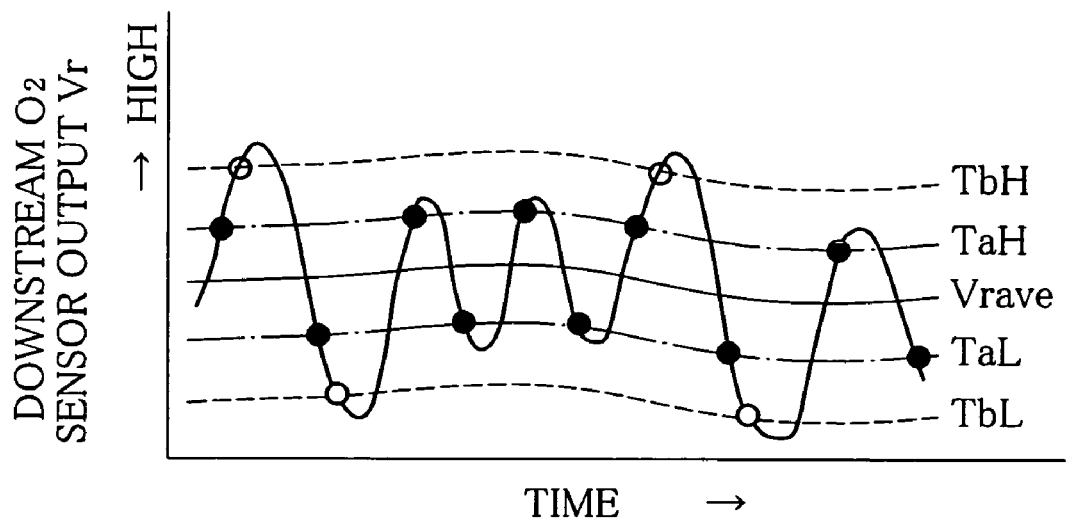
FIG. 4 is a time chart showing calculation of reverse frequency with respect to air-fuel ratio fluctuation.

As shown by "●" marks in a time chart of FIG. 4, each time the output voltage Vr passes the reverse reference values TaH and TaL, the downstream reverse frequency fr is measured. If there generates oscillation in the air-fuel ratio on the downstream side of the catalyst, the reverse reference values TaH and TaL accordingly shift to the rich or lean side along with the average value Vrave. Therefore, the downstream reverse frequency fr is not affected by the oscillation of the air-fuel ratio and can be measured with accuracy.

In Step S16, the ECU 20 calculates reverse frequency ratio fr/ff from the upstream reverse frequency ff and the downstream reverse frequency fr, and makes a determination as to whether the calculated reverse frequency ratio fr/ff is greater than a deterioration determination value Ta (deterioration determining means). In the same light as in the case of the hysteresis constant $\alpha$, the deterioration determination value Ta is set as a smaller value (for example, 0.2) than an after-mentioned failure determination value Tb with the aim of making a deterioration determination at an earlier stage.

If there is no symptom of deterioration in the three-way catalyst 13, the output voltage Vr of the downstream $O_2$ sensor 17 hardly fluctuates or slightly fluctuates. Therefore, the reverse frequency ratio fr/ff is calculated to be a smaller value than the deterioration determination value Ta, and Step S16 makes a "NO" determination. At this point, the ECU 20 advances the procedure to Step S18. After the low NOx control flag F2 is reset in Step S18, the determination completion flag F1 is set in Step S24, and the routine is terminated.

Consequently, when the routine of catalyst failure determination is carried out again, Step S2 makes a "YES" determination, leading to an immediate termination of the routine. For this reason, the above-described deterioration determination is made only once at the time of engine startup. In this case, the execution of the low NOx control is suspended, and regular fuel injection control, EGR control, and ignition timing control are executed. Additionally, when the internal combustion engine 1 is stopped and restarted, the routine of catalyst failure determination is executed. However, as long as the three-way catalyst 13 is normal, the low NOx control flag F2 is maintained in the reset state, so that the procedure similar to the foregoing is carried out in and after Step S6.

When Step S16 makes a "YES" determination in response to an increase in deterioration of the three-way catalyst 13, it is judged that the NOx emissions from the three-way catalyst start to increase, and the ECU 20 advances the procedure from Step S16 to Step S20. In Step S20, the ECU 20 sets the low NOx control flag F2, and in subsequent Step S22, stores the reverse frequency ratio fr/ff of this moment in a storage device as a present deterioration index of the three-way catalyst 13. After setting the determination completion flag F1 in Step S24, the ECU 20 terminates the routine. The stored reverse frequency ratio fr/ff is stored in the same manner as the low NOx control flag F2, and is backed up with a battery even if the ignition switch is turned OFF. Accordingly, when the internal combustion engine 1 is restarted, the ECU 20 makes a "YES" determination in Step S4, and advances the procedure to Step S32.

The deterioration determination is not confined to one time as described above. For example, if the deterioration determination is continuously repeated during the operation of the internal combustion engine 1, and the reverse frequency ratio fr/ff greater than past values is calculated, the value that has been stored in the storage device in Step S22 may be renewed as a latest value.

Figure 5:
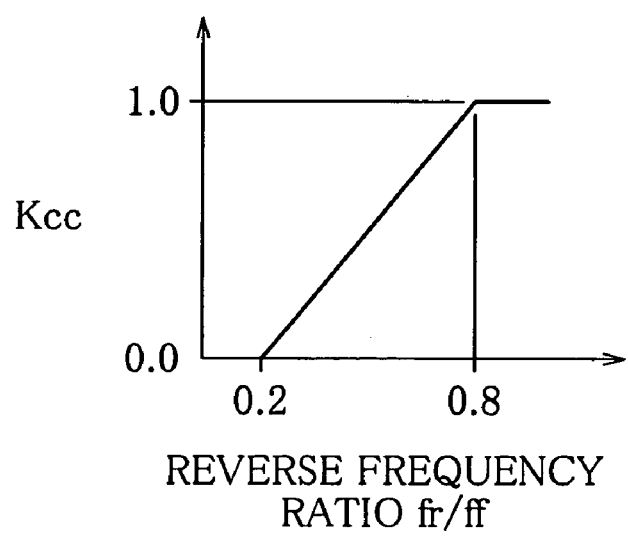
FIG. 5 is a graph showing a conversion map for calculating a correction coefficient from a reverse frequency ratio.

In Step S32, the ECU 20 switches the fuel injection control, the EGR control, and the ignition timing control executed in another routine from the regular control to the low NOx control, and suppresses the NOx emissions from the internal combustion engine, to thereby compensate for the deterioration of NOx purification of the three-way catalyst (low NOx control means). To be specific, based on the reverse frequency ratio fr/ff stored at the previous operation, a correction coefficient Kcc (0 to 1.0) are calculated correspondingly to each control process from a conversion map of FIG. 5. In each control process, not only a map for calculating a base value of a regular control amount but also a map for determining a base value for the low NOx control is preset. Based on the calculated correction coefficient Kcc, the ECU 20 performs a complementing procedure between both the maps, to thereby calculate a base value corresponding to the correction coefficient Kcc. Various kinds of correction are carried out with respect to this base value, and a final control amount is determined and applied to the control.

In brief, the base value based on the correction coefficient Kcc in the low NOx control is so set as to lower the NOx contained in exhaust gas, compared to a regular base value. Specific base value-setting conditions will be exemplified below with regard to each control process.

For example, as for an integral gain of air-fuel ratio feedback in the fuel injection control, it is increased or decreased from the base value at the time of regular control by the ECU 20 according to the correction coefficient Kcc. Alternately, the ECU 20 changes a reference value of a reverse level of the upstream $O_2$ sensor 16 from the base value at the time of the regular control to the rich side (for example, from 0.5 V to 0.6 V) according to the correction coefficient Kcc to facilitate the determination of a lean condition. By so doing, the air-fuel ratio is made rich, to thereby lower the NOx.

The NOx lowering action caused by enriching the air-fuel ratio is attributed to a NOx reducing action of the three-way catalyst 13. Therefore, preferably, the enrichment of the air-fuel ratio is started after the engine starts up, and the three-way catalyst 13 is activated.

If the control in execution is the one in which a target value of the feedback control using the upstream $O_2$ sensor 16 is corrected on the basis of difference between the output voltage Vr of the downstream $O_2$ sensor 17 and a target value (for example, the output voltage Vr corresponding to the theoretical air-fuel ratio) for the purpose of compensation for the deterioration of the upstream $O_2$ sensor 16 and the like, the air-fuel ratio may be made rich by changing the target value on the downstream $O_2$ sensor 17 side from the base value at the time of the regular control to the rich side according to the correction coefficient Kcc.

In the EGR control, the ECU 20 changes the opening of the EGR valve 19, which is obtained from a given EGR map, from the base value at the time of the regular control to an open side according to the correction coefficient Kcc. By so doing, the ECU 20 increases an EGR circulation amount to lower the NOx. In addition, the circulation of the EGR may be started within a lower water-temperature range.

In the ignition timing control, the ECU 20 changes the ignition timing obtained from a given ignition timing map from the base value at the time of the regular control to a retard side according to the correction coefficient Kcc, to thereby retard the ignition timing to lower the NOx.

The NOx lowering action caused by increasing the EGR amount and retarding the ignition timing results from a drop in combustion temperature. Consequently, such NOx lowering action can be achieved regardless of the activated state of the three-way catalyst 13, and can be carried out at the beginning of engine startup.

The ECU 20 does not begin the low NOx control immediately after the determination of deterioration of the three-way catalyst 13 and stands ready until the subsequent engine startup. This is because if a switchover to the low Nox control is carried out in the middle of engine operation, there is the fear that the driver has a peculiar feeling due to a change of output characteristics, and moreover the increase of deterioration of the catalyst is relatively slow and requires no particular urgent countermeasure. Therefore, the low NOx control is started at the beginning of the subsequent engine startup, and this prevents the driver from feeling peculiar, which results from the change of the output characteristics. Occasionally, however, the output characteristics are scarcely changed depending on particulars of the low NOx control. In this case, the low NOx control may be started immediately after the deterioration determination.

After implementing the above-mentioned low NOx control in Step S32, the ECU 20 advances the procedure to Step S34. Although the procedure in and after Step S34 is similar to the deterioration determination carried out in Steps S6 to S16, threshold values are different in order to make a determination of the failure of the three-way catalyst 13, which is caused by the increase of deterioration of the catalyst.

When the execution conditions of catalyst deterioration and failure determination are satisfied in Step S34, the ECU 20 calculates the upstream reverse frequency ff in Step S36, and calculates the average Vrave of the output voltage Vr of the downstream $O_2$ sensor 17 in the following Step S38. These procedures are carried out using the same technique as in Steps S8 and S10, and the overlapping part will not be described.

Thereafter, the ECU 20 advances the procedure to Step S40, and calculates reverse reference values for failure determination TbH and TbL according to the following formulae (4) and (5).

$$TbH = Vrave + \beta \quad (4)$$

$$TbL = Vrave - \beta \quad (5)$$

where $\beta$ is a hysteresis constant, which is set as a greater value (for example, 0.156 V) than the hysteresis constant $\alpha$ for deterioration determination.

In Step S42, the ECU 20 calculates the downstream reverse frequency (first downstream reverse frequency) fr on the basis of the reverse reference values TbH and TbL. This procedure is carried out using the same technique as in Step S14. As shown by "○" marks in the time chart of FIG. 4, the downstream reverse frequency fr is calculated from the number of times the output voltage Vr of the downstream $O_2$ sensor 17 passes the reverse reference values TbH and TbL that are set on the increase side and the decrease side from the average value Vrave, respectively. In subsequent Step S44, the ECU 20 calculates the reverse frequency ratio fr/ff and makes a determination as to whether the reverse frequency ratio fr/ff is greater than the failure determination value Tb (failure determining means). As described, the failure determination value Tb is set as a greater value (for example, 0.8) than the deterioration determination value Ta.

Due to the setting of the reverse reference values TbH and TbL based on the hysteresis constant β, the number of times the output voltage Vr passes the reverse reference values TbH and TbL is decreased (decreased from "●" mark to "○" mark in FIG. 4), compared to the number of times at the point of deterioration determination. In result, the reverse frequency ratio fr/ff is calculated as a small value. The failure determination value Tb itself is greater than the deterioration determination value Ta, so that the ECU 20 makes a "NO" determination in Step S44 and terminates the routine at the beginning of the low NOx control. During this procedure, the warning light 23 is kept OFF, and the failure indication is not provided to the driver.

When Step S44 makes a "YES" determination due to the increase of deterioration of the three-way catalyst 13, the ECU 20 makes a determination of the failure of the three-way catalyst 13 and advances the procedure from Step S44 to Step S46. After turning on the warning light 23 in Step S46, the ECU 20 terminates the routine.

Because of the indication of the warning light 23, the driver recognizes the failure of the three-way catalyst 13 and takes the vehicle to a repair shop. At the repair shop, not only repair work including the replacement of the three-way catalyst 13 but also resetting of the low NOx control flag F2, extinction of the warning light 23, and the like are done by erasing a failure code in the ECU 20.

The ECU 20 makes the determination of the deterioration and failure of the three-way catalyst 13 as described above. After the deterioration determination is made, the increase of the NOx emissions is suppressed by the low NOx control, making it possible to make a failure determination with accuracy even in the event of subtle aggravation of exhaust gas as described below.

Figure 6:
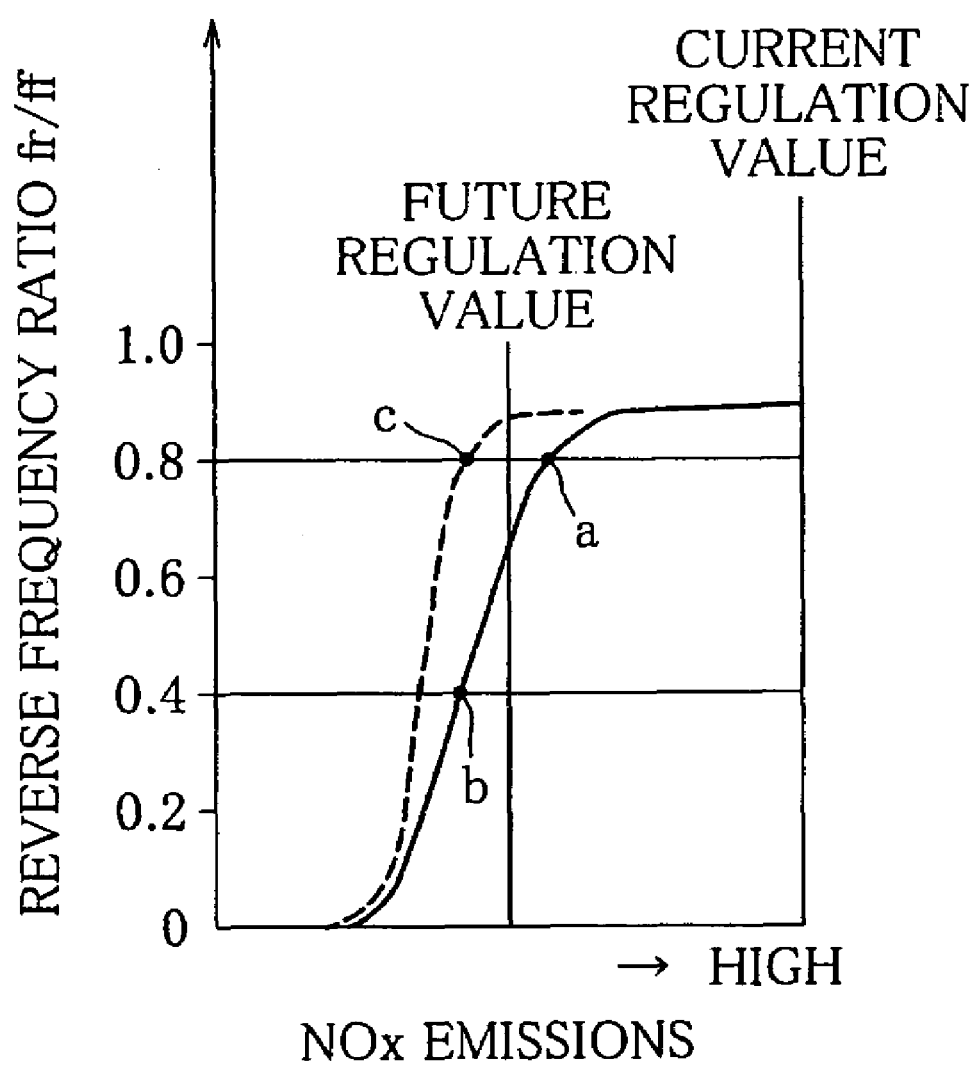
FIG. 6 is a graph showing an $O_2$ sensor reverse frequency ratio with respect to NOx emissions from a catalyst in the process of catalyst deterioration.

FIG. 6 is a graph showing the relationship of the reverse frequency ratio fr/ff of the $O_2$ sensors 16 and 17 with respect to the NOx emissions from the catalyst in the process of catalyst deterioration. The drawing shows the OBD regulation values in North America for reference. A solid line in the drawing shows the reverse frequency ratio fr/ff of the $O_2$ sensors 16 and 17 during non-operation of the low NOx control. In proportion to the increase of the NOx emissions, the reverse frequency ratio increases relatively slow. Therefore, in case that the failure determination value Tb is set to be 0.8, it is impossible, with respect to the future OBD regulation value, to make a failure determination before the NOx emissions exceeds the regulation value.

In order to suppress the increase of the NOx emissions, attributable to a decline in NOx purification performance of the three-way catalyst, the low NOx control is implemented on the basis of the deterioration determination of the NOx purification carried out prior to the failure determination. As a result, the NOx emissions are reduced, while the reverse frequency ratio fr/ff does not change. Therefore, the relationship between the NOx emissions from the catalyst and the reverse frequency ratio fr/ff of the $O_2$ sensors 16 and 17 is changed into relationship in which the reverse frequency ratio fr/ff sharply increases in proportion to the increase of the NOx emissions as shown by a broken line in the drawing. As a consequence, the reverse frequency ratio fr/ff greatly increases if only the NOx emissions slightly increase, and the reverse frequency ratio fr/ff reaches 0.8 that is the failure determination value Tb at point c before the NOx emissions exceed the future OBD regulation value, to thereby make a failure determination. This makes it possible to make the determination of the failure of the three-way catalyst 13 in the event of more subtle aggravation of exhaust gas.

Furthermore, since the failure determination value Tb is still set to be 0.8, there is no fear that determination accuracy is decreased as in the case where the failure determination value Tb is reduced to adapt the failure determination with respect to the future OBD regulation value. Consequently, it is possible to prevent an adverse effect when the determination accuracy is decreased, that is to say, a situation in which the three-way catalyst 13 is unnecessarily replaced with another due to an erroneous determination or the like.

As described, the failure determination based on the OBD regulation value and the like needs to be performed at the point when the NOx or HC emissions from the three-way catalyst reach the regulation value due to the increase of deterioration of the three-way catalyst 13. If the low NOx control is not carried out, however, the deterioration of the three-way catalyst 13 causes the NOx emissions to exceed the future OBD regulation value before the failure determination is made. According to the embodiment, the low NOx control for suppressing the NOx emissions from the internal combustion engine is started at the point when the deterioration determination with respect to NOx purification is made prior to the failure determination. Therefore, it is possible to suppress the discharge of NOx from the internal combustion engine even before the failure determination is made, and to compensate for the deterioration of NOx purification of the three-way catalyst, to thereby keep the NOx emissions from the three-way catalyst equal to or less than the regulation value. It is also possible to make a catalyst failure determination with accuracy in the event of more subtle aggravation of exhaust gas.

In the low NOx control, a control amount for reducing the NOx emissions may be changed according to the reverse frequency ratio fr/ff, or a deterioration degree. By so doing, when the deterioration degree is small, the control amount is reduced, thereby making it possible to lessen effects on the internal combustion engine.

Although the description of the embodiment is finished, the aspect of the present invention is not limited to this embodiment. In the embodiment, for example, the deterioration determination is carried out using the same technique as in the failure determination of the three-way catalyst. However, it is not necessarily required to apply the same technique. On the contrary, it is possible, for example, to estimate a three-way catalyst deterioration degree per unit of time on the basis of the oxygen concentration in exhaust gas and catalyst temperature, to thereby infer a deterioration of the three-way catalyst from an integrated value of the deterioration degree.

Also in case that the deterioration determination is carried out using the same technique as in the failure determination of the three-way catalyst, it is not necessarily required to apply the above-described embodiment. In other words, according to the embodiment, for the purpose of making the deterioration determination at an earlier stage than the failure determination, the reverse reference values TaH and TaL other than the reverse reference values TbH and TbL for the failure determination are applied, and at the same time the deterioration determination value Ta other than the failure determination value Tb is applied. However, only the reverse reference values or the deterioration determination value may be differentiated from those or that for the failure determination. In this case, too, it is possible to make the deterioration determination with the timing earlier than the failure determination, and to obtain the same operation and advantages as in the embodiment by the low NOx control.

Moreover in the embodiment, the enrichment of air-fuel ratio, the increase of the EGR amount, and the retard of the ignition timing are carried out as the low NOx control. However, the low NOx control is not limited to these, and it is possible to skip any one of the control processes, or contrary, to add another technique capable of reducing the NOx emissions.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for an internal combustion engine, comprising:
   failure determining means for making a failure determination of a three-way catalyst of an internal combustion engine on the basis of an output of air-fuel ratio detecting means disposed upstream and downstream of said catalyst;
   deterioration determining means for determining a deterioration of said catalyst before said failure determining means makes a failure determination; and
   low NOx control means for controlling said internal combustion engine to be operated in an operating state where NOx emissions are lowered when said deterioration determining means determines a deterioration of the catalyst.

2. The control device for an internal combustion engine according to claim 1, wherein:
   said failure determining means carries out the failure determination of said catalyst when a reverse frequency ratio, which is the ratio between a reverse frequency of the output of said upstream air-fuel ratio detecting means and a reverse frequency of the output of said downstream air-fuel ratio detecting means, exceeds a given failure determination value; and
   said deterioration determining means carries out the deterioration determination of said catalyst when said reverse frequency ratio exceeds a deterioration determination value that is set as a smaller value than said failure determination value.

3. The control device for an internal combustion engine according to claim 1, wherein:
   said low NOx control means changes a control amount according to a deterioration degree of said catalyst, which is determined by said deterioration determining means.

4. The control device for an internal combustion engine according to claim 1, wherein:
   said low NOx control means implements at least one of enrichment of an air-fuel ratio of said internal combustion engine, an increase of an EGR amount, and retard of ignition timing, to thereby control said internal combustion engine to be operated in said operating state where NOx emissions are lowered.

5. The control device for an internal combustion engine according to claim 1, wherein:
   the low NOx control means controls said internal combustion engine to be operated in the operating state where NOx emissions are lowered by controlling a fuel injection.

6. The control device for an internal combustion engine according to claim 1, wherein:
   the low NOx control means controls said internal combustion engine to be operated in the operating state where NOx emissions are lowered by controlling an EGR.

7. The control device for an internal combustion engine according to claim 1, wherein:
   said low NOx control means lowers the NOx emissions by using a correction coefficient determined based on a reverse frequency ratio, which is a ratio between a reverse frequency of the output of said upstream air-fuel ratio detecting means and a reverse frequency of the output of said downstream air-fuel ratio detecting means, and
   the correction coefficient is determined based on a map.

8. A control device for an internal combustion engine, comprising:
   failure determining means for making a failure determination of a three-way catalyst of an internal combustion engine on the basis of an output of air-fuel ratio detecting means disposed upstream and downstream of said catalyst;
   deterioration determining means for determining a deterioration of said catalyst before said failure determining means makes a failure determination; and
   low NOx control means for controlling said internal combustion engine to be operated in an operating state where NOx emissions are lowered when said deterioration determining means determines a deterioration of the catalyst, wherein:
   said failure determining means finds the number of times the output of said downstream air-fuel ratio detecting means passes reverse reference values for failure determination, which are set on an increase side and a decrease side on the basis of a given neutral value, as a first downstream reverse frequency, and carries out the failure determination on the basis of the ratio between said first downstream reverse frequency and an upstream reverse frequency of the output of said upstream air-fuel ratio detecting means; and
   said deterioration determining means finds the number of times the output of said downstream air-fuel ratio detecting means passes a reverse reference value for deterioration determination, which is set to be closer to a neutral value side than to said reverse reference values for failure determination, as a second downstream reverse frequency, and carries out the deterioration determination on the basis of the ratio between said second downstream reverse frequency and the upstream reverse frequency.

9. A control device for an internal combustion engine, comprising:
   failure determining means for making a failure determination of a three-way catalyst of an internal combustion engine on the basis of an output of air-fuel ratio detecting means disposed upstream and downstream of said catalyst;
   deterioration determining means for determining a deterioration of said catalyst before said failure determining means makes a failure determination; and
   low NOx control means for controlling said internal combustion engine to be operated in an operating state where NOx emissions are lowered when said deterioration determining means determines a deterioration of the catalyst, wherein:
   said low NOx control means controls said internal combustion engine to be operated in said operating state where the NOx emissions are lowered, when said internal combustion engine is stopped and restarted after said deterioration determining means determines a deterioration of the catalyst.

* * * * *